United States Patent [19]
Beaudet

[11] Patent Number: 5,838,440
[45] Date of Patent: Nov. 17, 1998

[54] PATH LENGTH CONTROLLER PIEZO/ WIREBOARD BONDING PATTERN

[75] Inventor: Richard G. Beaudet, Inver Grove Heights, Minn.

[73] Assignee: Honeywell Inc., Minneapolis, Minn.

[21] Appl. No.: 954,639

[22] Filed: Oct. 20, 1997

[51] Int. Cl.⁶ .................................................. G01C 19/66
[52] U.S. Cl. ........................................................ 356/350
[58] Field of Search .............................. 356/350; 372/94, 372/107; 310/311, 348

[56] References Cited

U.S. PATENT DOCUMENTS

| | | |
|---|---|---|
| 3,581,227 | 5/1971 | Podgorski . |
| 3,906,394 | 9/1975 | Tanaka . |
| 4,113,387 | 9/1978 | Shutt . |
| 4,267,478 | 5/1981 | Ljung et al. ............................ 356/350 |
| 4,383,763 | 5/1983 | Hutchings et al. . |
| 4,628,515 | 12/1986 | Rodloff et al. . |
| 4,691,323 | 9/1987 | Ljung et al. . |
| 4,831,632 | 5/1989 | Simms . |
| 4,865,436 | 9/1989 | Ahonen et al. . |
| 5,102,214 | 4/1992 | Steele et al. . |
| 5,116,131 | 5/1992 | Farahani et al. ........................ 356/350 |
| 5,208,653 | 5/1993 | Mark et al. . |
| 5,373,360 | 12/1994 | Martin et al. . |
| 5,438,410 | 8/1995 | Killpatrick et al. . |

*Primary Examiner*—Samuel A. Turner
*Attorney, Agent, or Firm*—Albert K. Kau

[57] ABSTRACT

Disclosed is a path length control apparatus (PLC) for an optical device. The optical device, such as a ring laser gyroscope, is of the type that includes a block having an internal optical cavity that defines a closed optical path. A light source directs a light beam into the optical path, and a plurality of mirrors reflect the light beam about the path. The PLC includes a piezoelectric transducer (PZT) and a wireboard element. The PZT is mounted to one of the mirrors and alters, in response to a control voltage, the position of the mirror relative to the optical cavity to maintain a constant optical path length for the light beam. An adhesive having a ring shaped bonding pattern partially mechanically couples the wireboard element to the PZT so as to permit operation of the PZT free of resistance from the wireboard element.

12 Claims, 3 Drawing Sheets

PATH LENGTH CONTROLLER PIEZO/ WIREBOARD BONDING PATTERN

BACKGROUND OF THE INVENTION

This invention relates to inertial instrument sensors. In particular, the present invention is an adhesive pattern for bonding a wireboard to a piezoelectric device that controls the path length of laser light beams within an optical cavity of a ring laser gyroscope.

A ring laser gyroscope (RLG) is commonly used to measure the angular rotation of a vehicle, such as an aircraft. Such a gyroscope has two counter-rotating laser light beams which move within a closed loop optical path or "ring" with the aid of successive reflections from multiple mirrors. The closed path is defined by an optical cavity which is interior to a gyroscope frame or "block". In one type of RLG, the block includes planar top and bottom surfaces that are bordered by six planar sides that form a hexagon shaped perimeter. Three planar non-adjacent sides of the block form the mirror mounting surfaces for three mirrors at the corners of the optical path which is triangular in shape.

Operationally, upon rotation of the RLG about its input axis (which is perpendicular to and at the center of the planar top and bottom surfaces of the block), the effective path length of each counter-rotating laser light beam changes and a frequency differential is produced between the beams that is nominally proportional to angular rate. This differential is then measured by signal processing electronics to determine the angular rotation of the vehicle.

To produce accurate angular rate data (i.e., to minimize RLG false rotation errors), the path length of the counter-rotating laser light beams within the optical cavity must be constant (i.e., unchanging). However, since RLG's are in operation over a wide range of temperatures (i.e., a range of +185° F. to –70° F.), the material from which the block is made suffers from thermal expansion and contraction as the temperature changes. This temperature change causes expansion or contraction that produces a change in path length, that, if left uncorrected, results in RLG output indicating a rotation when there actually is none. Thus, RLG's typically include a path length control apparatus (PLC), the purpose of which is to maintain a constant path length for the counter-rotating laser light beams to avoid false rotation errors.

One such known PLC 10 for a block 12 of a RLG 14 is illustrated in FIGS. 1 and 2. The PLC 10 includes a piezoelectric transducer (PZT) 16 which is secured to a mirror 18 via an epoxy based adhesive 20. The epoxy adhesive 20 completely covers the interface (defined by a lower surface 22 of the PZT 16 and an upper surface 24 of the mirror 18) between the PZT 16 and the mirror 18. The mirror 18 is secured to a mirror mounting surface 26 of the optical block 12 via a frit seal 28 which extends completely about a circumferential surface 30 of the mirror 18. The mirror 18 communicates with laser bores 32 (only partially shown) of an optical cavity 34 (only partially shown) of the block 12 via cylindrical shaped well 36. The bores 32 and well 36 partially form a portion of a closed loop optical path 38 defined by the optical cavity 34. As seen in FIG. 1, the mirror 18 reflects counter-rotating laser light beams 40 at its respective corner of the closed loop optical path 38.

The PZT 16 is defined by a pair of piezoelectric elements 42 and 44 which are bonded together by a thin layer of conductive epoxy 45. Foil leads 46 and 48 extend from the PZT 16 and are connected to terminals 50 and 52, respectively, of a wireboard element 54. The wireboard element 54 is secured to the PZT 16 via a silicone based adhesive 55. As best seen in FIG. 2, the silicone adhesive 55 completely covers the interface (defined by a lower surface 56 of the wireboard element 54 and an upper surface 57 of the PZT 16) between the PZT 16 and the wireboard element 54. Leads 58 and 59 extend from the terminals 50 and 52, respectively, of the wireboard element 54 and are coupled to a regulated voltage source (not shown) which is in turn coupled to a detector (not shown) which monitors the intensity of the light beams 40. The PZT 16 takes an applied voltage delivered by the regulated voltage source, in response to a signal provided by the detector, and turns this voltage into a small but precisely controlled mechanical movement. This mechanical movement of the PZT 16 effects translational movement (as represented by double headed arrow 60) of the mirror 18, and thereby maintains a constant laser light beam path length even though temperature changes cause the material of the block 12 to expand and contract.

Though the above described PLC adequately maintains a constant path length for the counter-rotating laser light beams of the RLG so as to prevent false rotation errors, there are some disadvantages. In conditions of extreme cold (i.e., a range of –30° F. to –70° F.), the silicone based adhesive used to secure the wireboard element to the PZT becomes very rigid. When the PLC is subjected to vibration (such as may be caused by aircraft maneuvers, turbulence and/or engine operation), this cold temperature rigidity within the PLC allows the vibration to be more readily transferred through the PLC to the mirror to which the PLC is secured. This vibration transfer under extreme cold temperatures causes laser intensity fluctuations (i.e., changes in laser light beam path length due to translations of the PLC mirror) that result in RLG false rotation errors. Under conditions other than extreme cold temperatures, the flexible nature of the silicone based adhesive used to bond the PZT to the wireboard element mitigates the transfer of the vibration to the PLC mirror. In addition to laser intensity fluctuations, this cold temperature rigidity within the PLC results in inefficient operation of the regulated voltage source (i.e., the PLC driver). This inefficient operation takes the form of increased applied voltage needed to translate the PZT as compared to the applied voltage needed under conditions other than extreme cold temperatures.

There is a need for improved PLC's for maintaining a constant path length for the counter-rotating laser light beams of a RLG. In particular, there is a need for a PLC that, when subjected to vibration under extreme cold temperatures, will mitigate the transfer of vibration to the PLC mirror so as to substantially reduce laser intensity fluctuations and attendant false rotation errors. In addition, the PLC should allow for efficient operation of the PLC driver even under extreme cold temperatures. Lastly, the PLC should be relatively easy and inexpensive to manufacture.

SUMMARY OF THE INVENTION

The present invention is a path length control apparatus (PLC) for an optical device that includes a block having an internal optical cavity that defines a closed optical path, a light source for directing a light beam into the optical path, and a plurality of mirrors for reflecting the light beam about the optical path. The PLC includes a transduction device and a wireboard element. The transduction device is mounted to a mirror for altering, in response to a control voltage, the position of the mirror relative to the block internal optical cavity to maintain a constant optical path length for the light beam. A mounting arrangement partially secures the wireboard element to the transduction device such that the wireboard element is only partly mechanically coupled to the transduction device so as to permit operation of the transduction device free of resistance from the wireboard element.

This PLC maintains a constant path length for the light beam of the optical device. In particular, since the mounting arrangement only partially secures the wireboard element to the transduction device, this PLC, when subjected to vibration under extreme cold temperatures (i.e., a range of −30° F. to −70° F.), will mitigate the transfer of vibration to the mirror secured to the PLC. By mitigating the transfer of vibration, this PLC substantially reduces light beam intensity fluctuations and attendant errors. In addition, by only partially securing the wireboard element to the transduction device to only partly mechanically couple the wireboard element and the transduction device, this PLC permits efficient operation, even under extreme cold temperatures, of a PLC driver providing the control voltage. Moreover, this PLC is relatively easy and inexpensive to manufacture.

DETAILED DESCRIPTION OF THE PREFERRED EMBODIMENT

Figure 1:
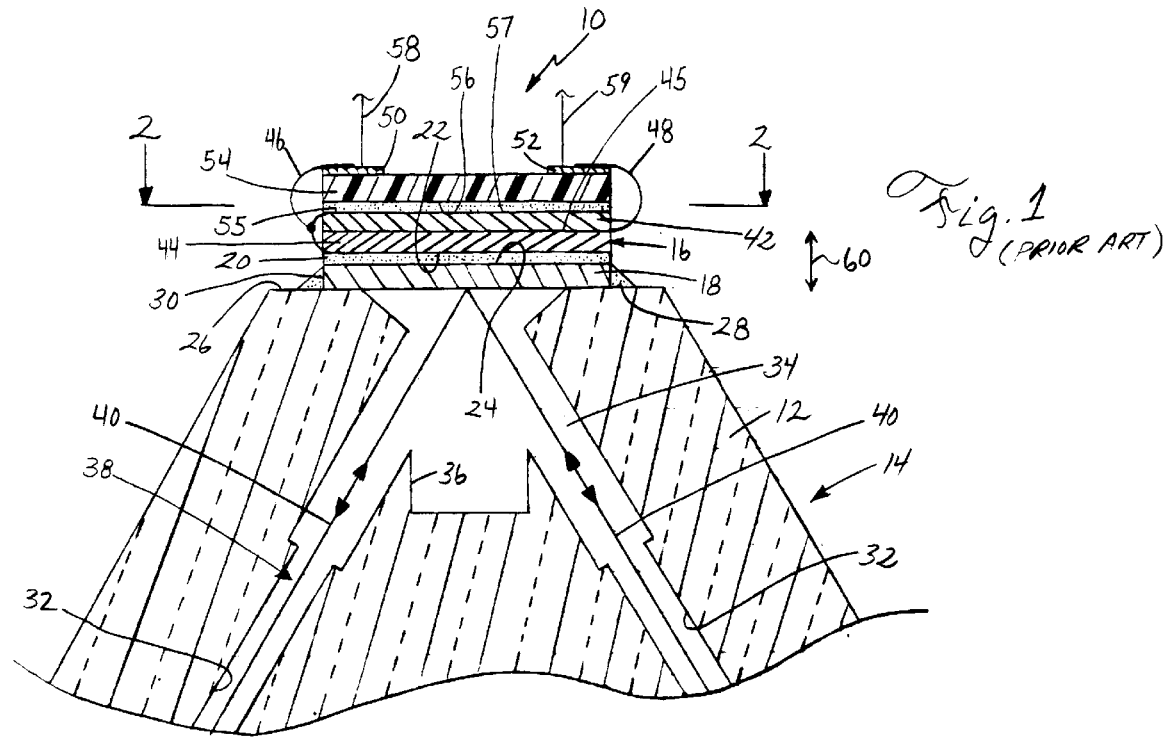
FIG. 1 is a partial sectional view of a path length control apparatus (PLC) for a ring laser gyroscope (RLG) incorporating a known adhesive bonding pattern for securing a piezoelectric transducer (PZT) to a wireboard.
Figure 2:
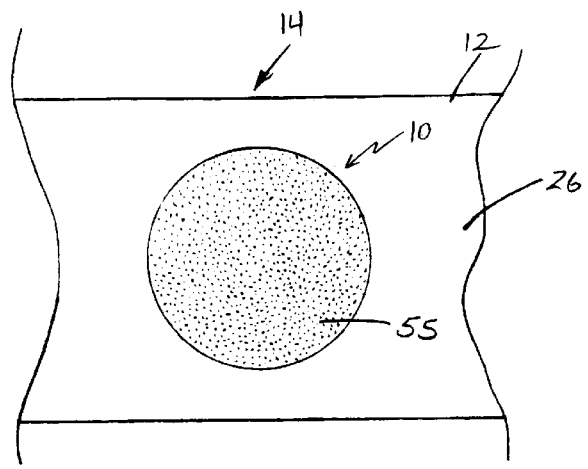
FIG. 2 is a reduced sectional view taken along line 2—2 in FIG. 1 of the adhesive bonding pattern known to those skilled on the art.
Figure 3:
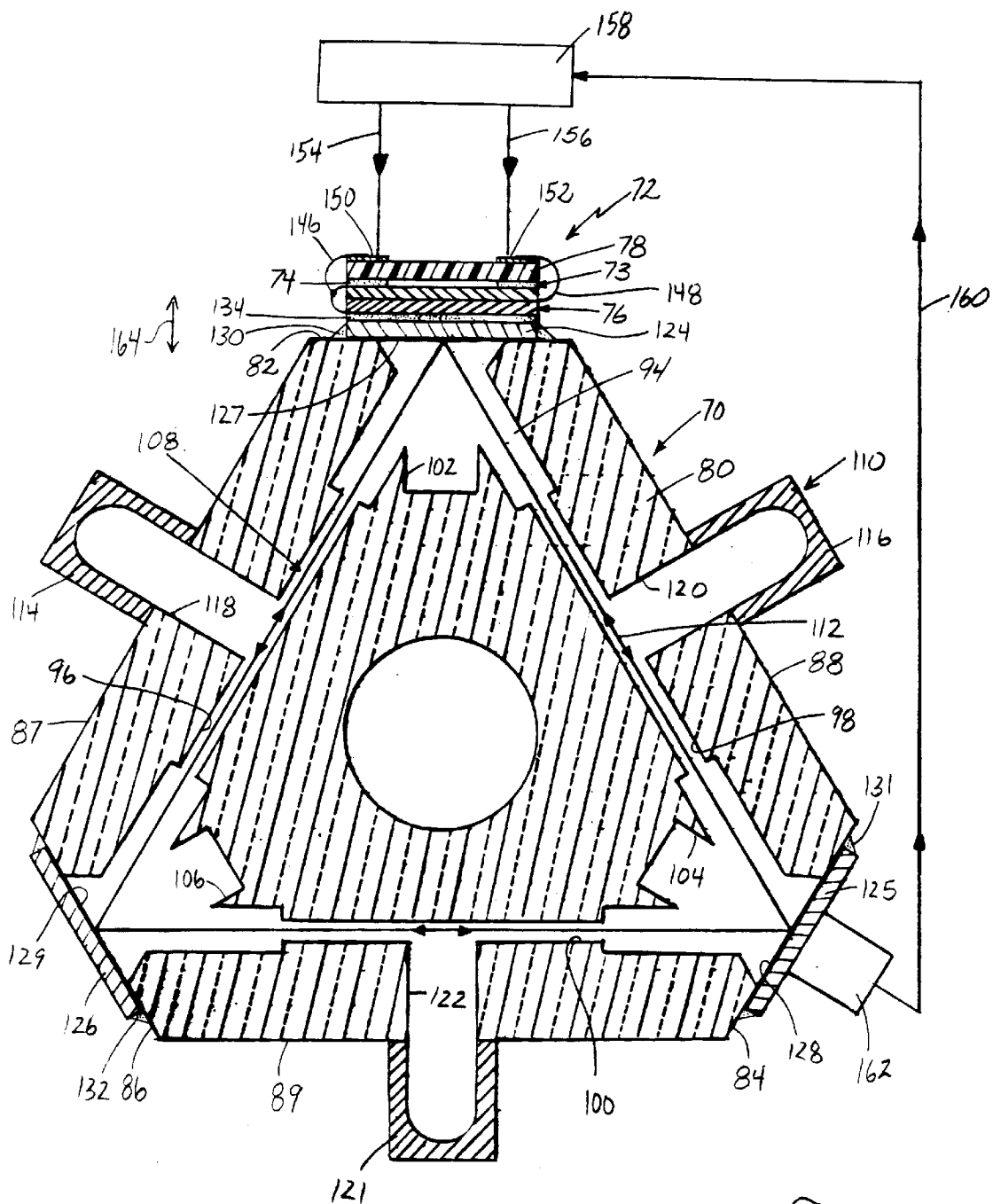
FIG. 3 is a plan sectional view of a PLC for a RLG incorporating an adhesive bonding pattern for securing a PZT to a wireboard in accordance with the present invention.

A ring laser gyroscope (RLG) 70 including a path length control apparatus (PLC) 72 incorporating an adhesive 73 having a ring shaped bonding pattern 74 for partially securing (i.e., mounting) a piezoelectric transducer (PZT) 76 to a wireboard element 78 in accordance with the present invention is illustrated generally in FIG. 3. The RLG 70 includes a gyroscope frame or "block" 80. The block 80 is generally triangular shaped with a hexagonal outer periphery. The hexagonal outer periphery includes three planar non adjacent sides that form first, second and third mirror mounting surfaces 82, 84 and 86, respectively, and three further planar non adjacent sides 87, 88 and 89, respectively. The mounting surfaces 82, 84 and 86 and sides 87, 88 and 89 form a border for planar top and bottom surfaces 90 and 92 (see FIG. 5), respectively, of the block 80. The block 80 is formed of a glass ceramic or like material. Suitable optical block materials include glass ceramic materials marketed under the trademarks "Cervit" and "Zerodur". A suitable glass material is marketed under the trademark "BK-7".

As seen best in FIG. 3, an internal optical cavity 94 of the block 80 comprises three substantially straight laser bores 96, 98 and 100, respectively, that are interconnected at the mounting surfaces 82, 84 and 86 by three cylindrical shaped wells 102, 104 and 106, respectively. The bores 82, 84 and 86 and the wells 102, 104 and 106 are bored within the block 80 to form a triangular shaped closed loop optical path 108, with the mounting surfaces 82, 84 and 86 located at corners of the optical path 108. A laser gain source 110 for directing a pair of counter-rotating laser light beams 112 into the optical path 108 defined by the optical cavity 94 includes a pair of anodes 114 and 116, respectively. The anodes 114 and 116 are bonded to sides 87 and 88, respectively, of the block 80 and are adapted to communicate with laser bores 96 and 98, respectively, through interconnect cavities 118 and 120, respectively. A cathode 121, of the gain source 110, is bonded to side 89 of the block 80 and communicates with laser bore 100 through interconnect tunnel 122. A quantity of lasing gas, such as HeNe, is contained within the optical cavity 94.

In operation, with a sufficiently large potential applied between the cathode 121 and the anodes 114 and 116 a pair of electrical discharges flow between the cathode 121 and the anodes 114 and 116. The discharge currents ionize the lasing gas and thereby provide the optical gain to sustain the pair of counter-rotating laser light beams 112 within the closed loop optical path 108 defined by the optical cavity 94.

As seen best in FIG. 3, three mirrors 124, 125 and 126, respectively, having reflective surfaces 127, 128 and 129, respectively, are secured via frit seals 130, 131 and 132, respectively, to the first, second and third mirror mounting surfaces 82, 84 and 86, respectively. Each of the frit seals 130, 131 and 132 extends completely about the circumference of the respective mirror 124, 125 and 126. The reflective surfaces 127, 128 and 129 of each of the mirrors 124, 125 and 126 reflects the light beams 112 at its respective corner of the closed loop optical path 108 defined by the optical cavity 94.

Figure 4:
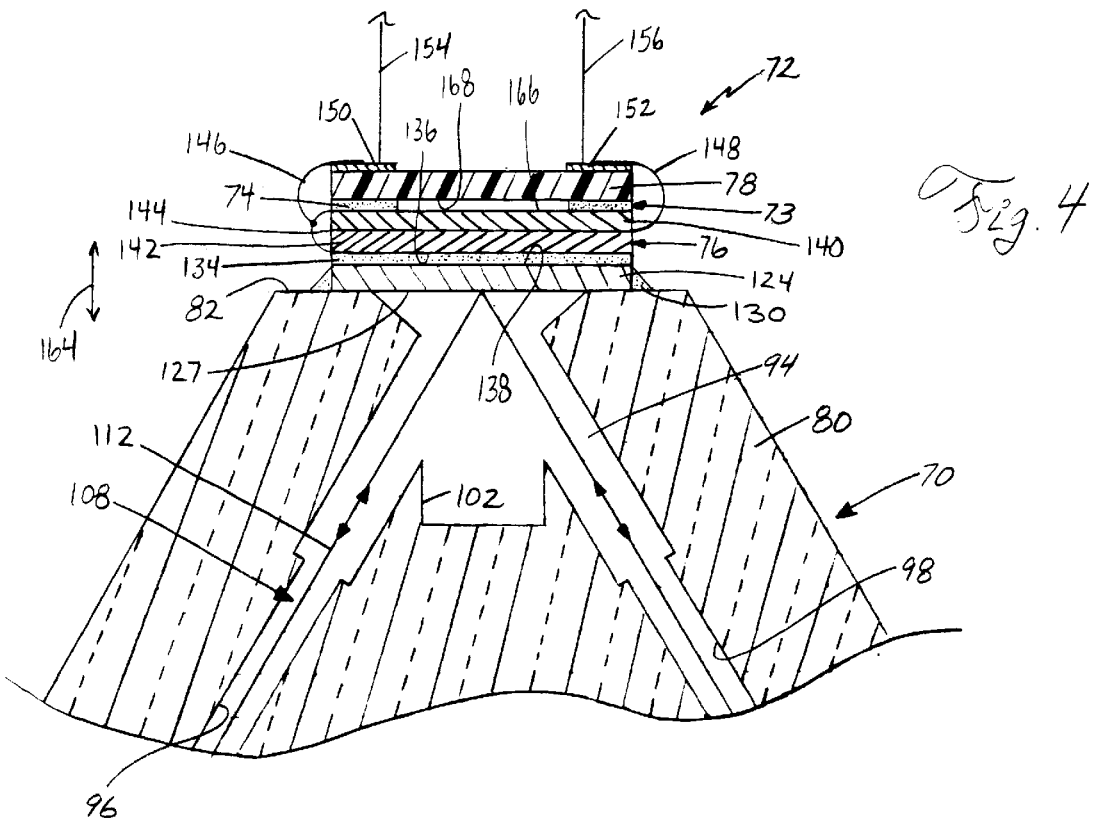
FIG. 4 is an enlarged partial sectional view of a portion of the RLG in FIG. 1 illustrating the adhesive bonding pattern of the PZT/wireboard interface.
Figure 5:
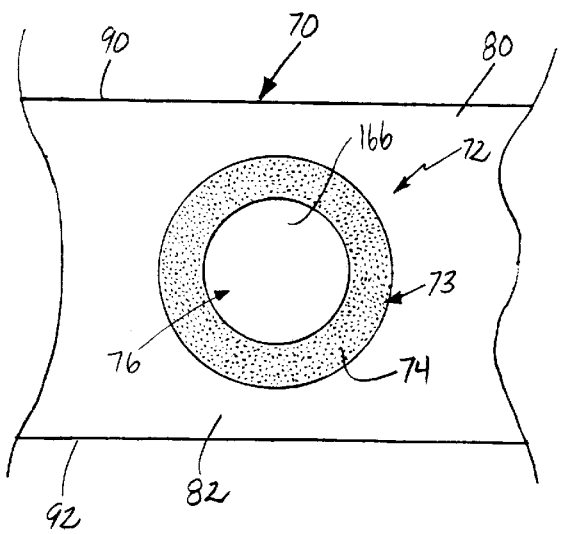
FIG. 5 is a reduced sectional view taken along line 5—5 in FIG. 4 of the adhesive bonding pattern in accordance with the present invention.

As seen best in FIGS. 4 and 5, the PZT 76 of the PLC 72 is secured to the mirror 124 via an epoxy based adhesive 134. The epoxy adhesive 134 completely covers the interface (defined by a lower surface 136 of the PZT 76 and an upper surface 138 of the mirror 124) between the PZT 76 and the mirror 124. The PZT 76 is defined by a pair of piezoelectric elements 140 and 142 which are bonded together by a thin layer of conductive epoxy 144. Foil leads 146 and 148 extend from the PZT 76 and are connected to terminals 150 and 152, respectively, of the wireboard element 78.

As seen best in FIG. 3, leads 154 and 156 extend from the terminals 150 and 152, respectively, of the wireboard element 78 and are coupled to a PLC driver 158, such as a regulated voltage source. The PLC driver 158 is in turn coupled, via lead 160, to a detector 162, such as a laser intensity monitor which monitors the intensity of the counter-rotating laser light beams 112. The PZT 76 takes an applied control voltage delivered by the PLC driver 158, in response to a signal provided by the detector 162, and turns this voltage into a small but precisely controlled mechanical movement. This mechanical movement of the PZT 76 effects translational movement (as represented by double headed arrow 164) of the mirror 124, and thereby maintains a constant laser light beam path length even though temperature changes cause the material of the block 80 to expand and contract.

As seen best in FIGS. 4 and 5, the wireboard element 78 is partially bonded to the PZT 76 via the adhesive 73. In one preferred embodiment, the adhesive 73 is a silicone based adhesive, such as "3145 RTV" a registered trademark of Dow Corning of Midland, Michigan. The adhesive 73 forms the ring shaped bonding pattern 74 that covers substantially 60% of the surface area of an upper surface 166 of the PZT 76 at the interface (defined by a lower surface 168 of the wireboard element 78 and the upper surface 166 of the PZT 76) between the PZT 76 and the wireboard element 78. The bonding pattern 74 covers only the periphery of the upper surface 166, with the outer peripheral edge of the bonding pattern 74 coinciding with the outer peripheral edge of the upper surface 166 of the PZT 16. By bonding the wireboard element 78 to the PZT 76 only at the periphery of the upper surface 166, the wireboard element 78 is only partly mechanically coupled to the PZT 76. Since the center of the PZT 76 is free of mechanical coupling to the wireboard element 78, operation of the PZT 76 is substantially free of resistance from the wireboard element 78 at the region where the PZT 76 exhibits its greatest mechanical movement.

The PLC 72 maintains a constant path length for the counter-rotating light beams 112 of the RLG 70. In particular, since the ring shaped bonding pattern 74 of the adhesive 73 only partially secures the wireboard element 78 to the PZT 76, the PLC 72, when subjected to vibration under extreme cold temperatures (i.e., a range of −30° F. to −70° F.), will mitigate the transfer of vibration to the mirror 124. By mitigating the transfer of vibration, the PLC 72 substantially reduces light beam intensity fluctuations and attendant rotation errors. In addition, by only partially securing the wireboard element 78 to the PZT 76 so as to only partly mechanically couple the wireboard element 78 and the PZT 76, the PLC 72 permits efficient operation, even under extreme cold temperatures, of a PLC driver 158 providing the control voltage. Moreover, the PLC 72 incorporating the piezo/wireboard bonding pattern 74, in accordance with the present invention, is relatively easy and inexpensive to manufacture.

Although the present invention has been described with reference to preferred embodiments, workers skilled in the art will recognize that changes may be made in form and detail without departing from the spirit and scope of the invention. For example, though the PLC has been described with reference to RLG, the PLC can be used in other optical devices, such as linear lasers, optical filters and scanning interferometers.

I claim:

1. A path length control apparatus for an optical device including a block having an internal optical cavity that defines a closed optical path, a light source for directing at least one light beam into the optical path and a plurality of mirrors for reflecting the at least one light beam about the optical path, the path length control apparatus comprising:

transduction means mounted to at least one mirror of the plurality of mirrors for altering, in response to a control voltage, the position of the at least one mirror relative to the block internal optical cavity to maintain a constant optical path length for the at least one light beam;

a wireboard element; and mounting means for partially securing the wireboard element to the transduction means, such that the wireboard element is only partly mechanically coupled to the transduction means so as permit operation of the transduction means substantially free of resistance from the wireboard element.

2. The path length control apparatus of claim 1 wherein the mounting means is an adhesive for partially bonding the wireboard element to the transduction means.

3. The path length control apparatus of claim 2 wherein the adhesive is a silicone based adhesive.

4. The path length control apparatus of claim 2 wherein the adhesive forms a bonding pattern that covers a majority of a transduction means surface area at an interface between the wireboard element and the transduction means.

5. The path length control apparatus of claim 4 wherein the adhesive bonding pattern covers substantially 60% of the transduction means surface area at the interface between the wireboard element and the transduction means.

6. The path length control apparatus of claim 2 wherein the adhesive forms a bonding pattern that covers only a periphery of a transduction means surface at an interface between the wireboard element and the transduction means and leaves a center region of the transduction means surface free of adhesive.

7. The path length control apparatus of claim 6 wherein the bonding pattern is ring shaped.

8. The path length control apparatus of claim 7 wherein an outer peripheral edge of the ring shaped bonding pattern is coincides with an outer peripheral edge of the transduction means surface.

9. The path length control apparatus of claim 8 wherein the ring shaped bonding pattern covers a majority of the surface area of the transduction means surface at the interface between the wireboard element and the transduction means.

10. The path length control apparatus of claim 9 wherein the ring shaped bonding pattern covers substantially 60% of the transduction means surface area at the interface between the wireboard element and the transduction means.

11. The path length control apparatus of claim 1 wherein the transduction means is a piezoelectric transducer mounted to one mirror of the plurality of mirrors.

12. The path length control apparatus of claim 1 wherein the light source is a laser and the optical device is a ring laser gyroscope.

* * * * *